United States Patent
Wai et al.

(10) Patent No.: US 9,391,555 B2
(45) Date of Patent: Jul. 12, 2016

(54) SYSTEM AND METHOD TO CONTROL A SWITCHED RELUCTANCE MACHINE IN CONTINUOUS CONDUCTION

(71) Applicant: Caterpillar Inc., Peoria, IL (US)

(72) Inventors: Jackson Wai, Dunlap, IL (US); Carlos Nino Baron, Edwards, IL (US); Jesse Gerdes, Dunlap, IL (US); Ahmed Khalil, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 17 days.

(21) Appl. No.: 14/492,988

(22) Filed: Sep. 22, 2014

(65) Prior Publication Data

US 2016/0087570 A1    Mar. 24, 2016

(51) Int. Cl.
*H02P 6/00* (2006.01)
*H02P 25/08* (2016.01)

(52) U.S. Cl.
CPC ............ *H02P 25/082* (2013.01); *H02P 25/085* (2013.01)

(58) Field of Classification Search
CPC .................................. H02P 25/082; H02P 8/00
USPC .................. 318/138, 400.01, 400.14, 400.15, 318/400.21, 400.26, 400.27, 700, 701, 721, 318/779, 799, 800, 801, 430, 432; 388/800, 388/815, 823
See application file for complete search history.

(56) References Cited

U.S. PATENT DOCUMENTS

| | | | |
|---|---|---|---|
| 4,611,157 A | | 9/1986 | Miller et al. |
| 4,933,620 A | * | 6/1990 | MacMinn ............... H02P 25/08 318/685 |
| 5,469,039 A | * | 11/1995 | Stephenson ............. H02P 25/08 318/400.13 |
| 5,563,488 A | * | 10/1996 | Stephenson ............. H02P 25/08 318/400.13 |
| 5,780,949 A | | 7/1998 | Li |
| 6,008,615 A | | 12/1999 | Sugden |
| 6,864,658 B1 | * | 3/2005 | Torrey ................ H02P 25/0925 318/701 |
| 6,972,533 B2 | * | 12/2005 | Jordison ............... H02P 25/082 318/254.1 |
| 2003/0020436 A1 | | 1/2003 | Coles et al. |
| 2005/0077862 A1 | * | 4/2005 | Jordison ............... H02P 25/082 318/701 |
| 2008/0167769 A1 | | 7/2008 | Loudot et al. |
| 2013/0134912 A1 | | 5/2013 | Khalil et al. |

FOREIGN PATENT DOCUMENTS

JP        07075310         3/1995
KR    1020100026236       3/2010

* cited by examiner

*Primary Examiner* — Antony M Paul
(74) *Attorney, Agent, or Firm* — Miller, Matthias & Hull LLP

(57) ABSTRACT

A control system for a switched reluctance (SR) machine is disclosed. The SR machine may have a rotor and a stator. The control system may have a converter circuit operatively coupled to the stator and including a plurality of gates in selective communication with each phase of the stator, and a controller in communication with each of the stator and the converter circuit. The controller may be configured to command a fixed dwell of a theta-on angle and a theta-off angle and a varying current command to the plurality of gates when the SR machine is in a continuous conduction mode.

20 Claims, 4 Drawing Sheets

SYSTEM AND METHOD TO CONTROL A SWITCHED RELUCTANCE MACHINE IN CONTINUOUS CONDUCTION

FIELD OF THE DISCLOSURE

The present disclosure relates generally to switched reluctance machines and, more particularly, to systems and methods for controlling switched reluctance machines.

BACKGROUND OF THE DISCLOSURE

With the growing interest in energy conservation, increasingly more industrial work machines are supplied with electric drive assemblies for driving the work machine and operating its various tools or functions. Ongoing developments in electric drives have made it possible for electrically driven work machines to effectively match or surpass the performance of purely mechanically driven work machines while requiring significantly less fuel and overall energy. As electric drive assemblies become increasingly more commonplace with respect to industrial work machines, and the like, the demands for more efficient generators and techniques for controlling same have also increased.

A generator of an electric drive machine is typically used to convert mechanical power received from a primary power source, such as a combustion engine, into electrical power for performing one or more operations of the work machine. Additionally, a generator may be used to convert electrical power stored within a common bus or storage device into mechanical power. Among the various types of generators available for use with an electric drive assembly, switched reluctance (SR) machines have received great interest for being robust, cost-effective, and overall, more efficient. While currently existing systems and methods for controlling SR machines provide adequate control, there is still room for improvement.

In particular, a switched reluctance machine with a power dense design may typically experience a sudden jump in power level during a continuous conduction mode. Moreover, when in continuous conduction, small changes to the control input of the switched reluctance machine may lead to significantly large changes in power. Accordingly, there is a need to provide a control system and method that minimizes power jumps in switched reluctance machines during continuous conduction.

A method of controlling a switched reluctance drive is disclosed in U.S. Pat. No. 6,972,533, entitled, "Control of a Switched Reluctance Drive." The '533 patent describes a method of control that uses a combination of a switch-on angle, switch-off angle and current level to trigger an optional period of freewheeling which controls the standing current in the phase. In operation, the phase is switched on at the switch-on angle, and the current level is chosen a little below the natural peak current of the phase. The control system of the '533 patent is arranged such that when the phase current reaches the standing current, the phase is put into freewheel until the switch-off angle is reached.

While the '533 patent controls the standing current based on the current level, the '533 control system still uses the conventional on- and off-angles in addition to the standing current during continuous conduction. Using the conventional on- and off-angles may lead to unstable control of the switched reluctance drive because a small change in either of the angle parameters may lead to significant changes in power. Accordingly, improved systems and methods for controlling SR machines during continuous conduction are still needed.

SUMMARY OF THE DISCLOSURE

In accordance with one embodiment, a control system for a switched reluctance (SR) machine is disclosed. The SR machine may have a rotor and a stator. The control system may have a converter circuit operatively coupled to the stator and including a plurality of gates in selective communication with each phase of the stator, and a controller in communication with each of the stator and the converter circuit. The controller may be configured to command a fixed dwell of a theta-on angle and a theta-off angle to the plurality of gates when the SR machine is in a continuous conduction mode.

In accordance with another embodiment, an electric drive is disclosed. The electric drive may include a switched reluctance (SR) machine having a stator and a rotor rotatably disposed relative to the stator, a converter circuit operatively coupled to the stator and including a plurality of gates in selective communication with each phase of the stator, and a controller in communication with each of the stator and the converter circuit. The controller may be configured to control the plurality of gates during a continuous conduction mode according to a current command and a constant dwell of a theta-on angle and a theta-off angle.

In accordance with yet another embodiment, a method of controlling a switched reluctance (SR) machine is disclosed. The SR machine may have a rotor, a stator, a converter circuit operatively coupled to the stator and including a plurality of gates in selective communication with each phase of the stator, and a controller in communication with each of the stator and the converter circuit. The method may include the controller determining a continuous conduction mode of the SR machine; and when the SR machine is in the continuous conduction mode, the controller driving the plurality of gates of the converter circuit according to a current command and a fixed dwell of a theta-on angle and a theta-off angle.

These and other aspects and features will become more readily apparent upon reading the following detailed description when taken in conjunction with the accompanying drawings. In addition, although various features are disclosed in relation to specific exemplary embodiments, it is understood that the various features may be combined with each other, or used alone, with any of the various exemplary embodiments without departing from the scope of the disclosure.

While the present disclosure is susceptible to various modifications and alternative constructions, certain illustrative embodiments thereof will be shown and described below in detail. The disclosure is not limited to the specific embodiments disclosed, but instead includes all modifications, alternative constructions, and equivalents thereof.

DETAILED DESCRIPTION

Reference will now be made in detail to specific embodiments or features, examples of which are illustrated in the accompanying drawings. Generally, corresponding reference numbers will be used throughout the drawings to refer to the same or corresponding parts.

Figure 1:
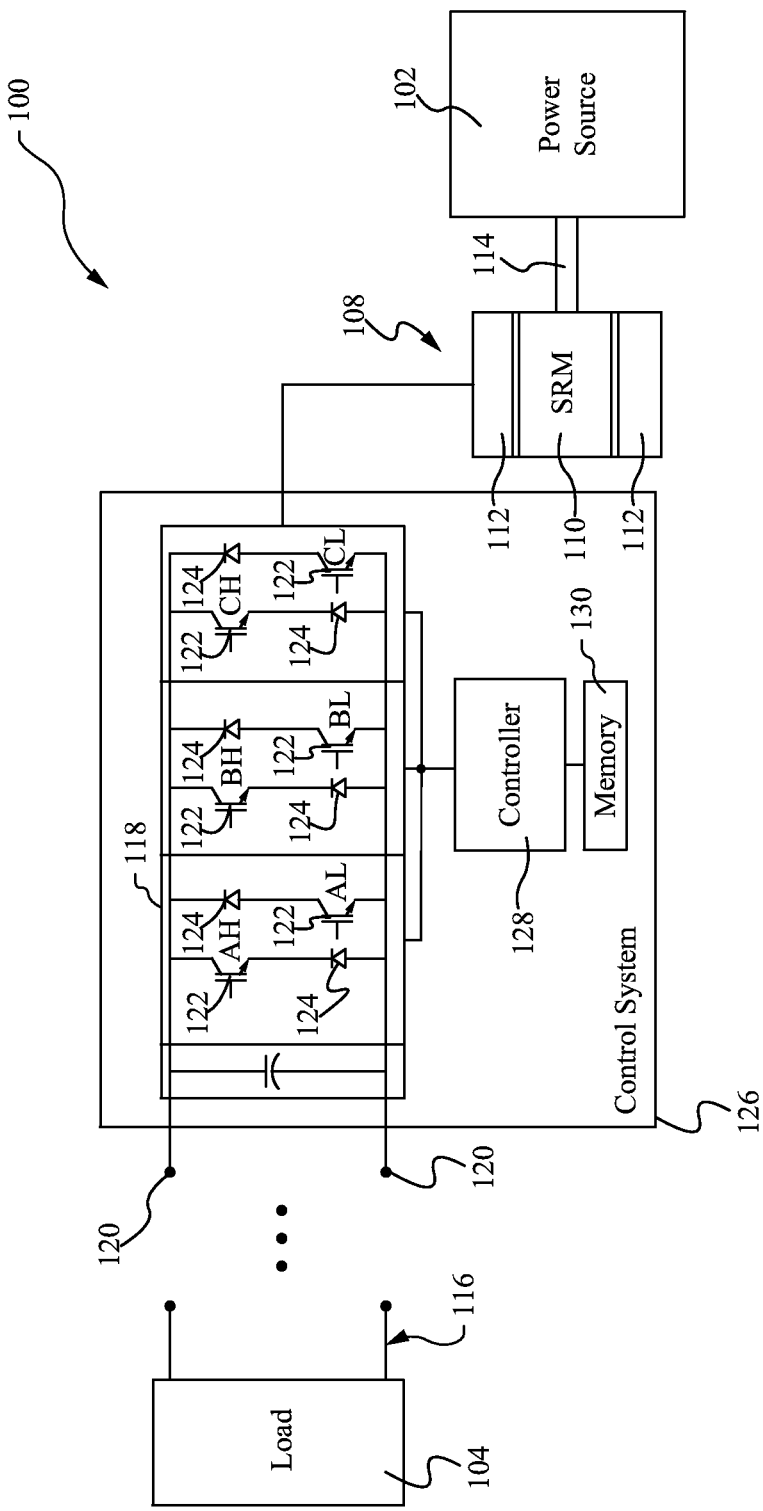
FIG. 1 is a schematic view of an electric drive with a control system for controlling a switched reluctance (SR) machine in accordance with one embodiment of the present disclosure.

FIG. 1 schematically illustrates an electric drive 100 that may be employed to communicate power between a power source 102 and a load 104, in accordance with an embodiment of the present disclosure. The power source 102 may include a primary power source, such as a diesel engine, a gasoline engine, a natural gas engine, or any other source of mechanical or rotational energy commonly used in association with mobile tools, industrial machines, and the like. The power source 102 may alternatively include a primary power source used in conjunction with stationary applications, such as, wind turbines, hydro-electric dams, batteries, fuel cells, or any other suitable source of energy. The load 104 may include one or more devices or components which receive electrical power. For example, with respect to industrial work machines or mobile work vehicles, the load 104 may include one or more motors for operating tools of the machine and/or one or more traction motors for causing motion of the vehicle.

Moreover, mechanical energy that is supplied by the power source 102 may be converted into electrical power by the electric drive 100 for use by the load 104. Conversely, any electrical power that is supplied by the load 104 and/or the electric drive 100 may be supplied to drive mechanical power to the power source 102. In one example, shown in FIG. 2, a machine 106 may employ the electric drive 100 to communicate power between the power source 102 and the loads 104. Although machine 106 is illustrated as a wheel loader, the machine 106 may be of any other type. As used herein, the term "machine" refers to a mobile machine that performs a driven operation involving physical movement associated with a particular industry, such as, without limitation, landscaping, construction, mining, agriculture, transportation, forestry, etc.

Non-limiting examples of machines include commercial and industrial machines, such as, loaders, tractors, motor graders, trucks, earth-moving vehicles, mining vehicles, backhoes, material handling equipment, agricultural equipment, marine vessels, on-highway vehicles, and other types of machines that operate in a work environment. It is also to be understood that the machine 106 is shown primarily for illustrative purposes to assist in disclosing features of various embodiments, and that FIG. 2 does not depict all of the components of a machine.

Figure 2:
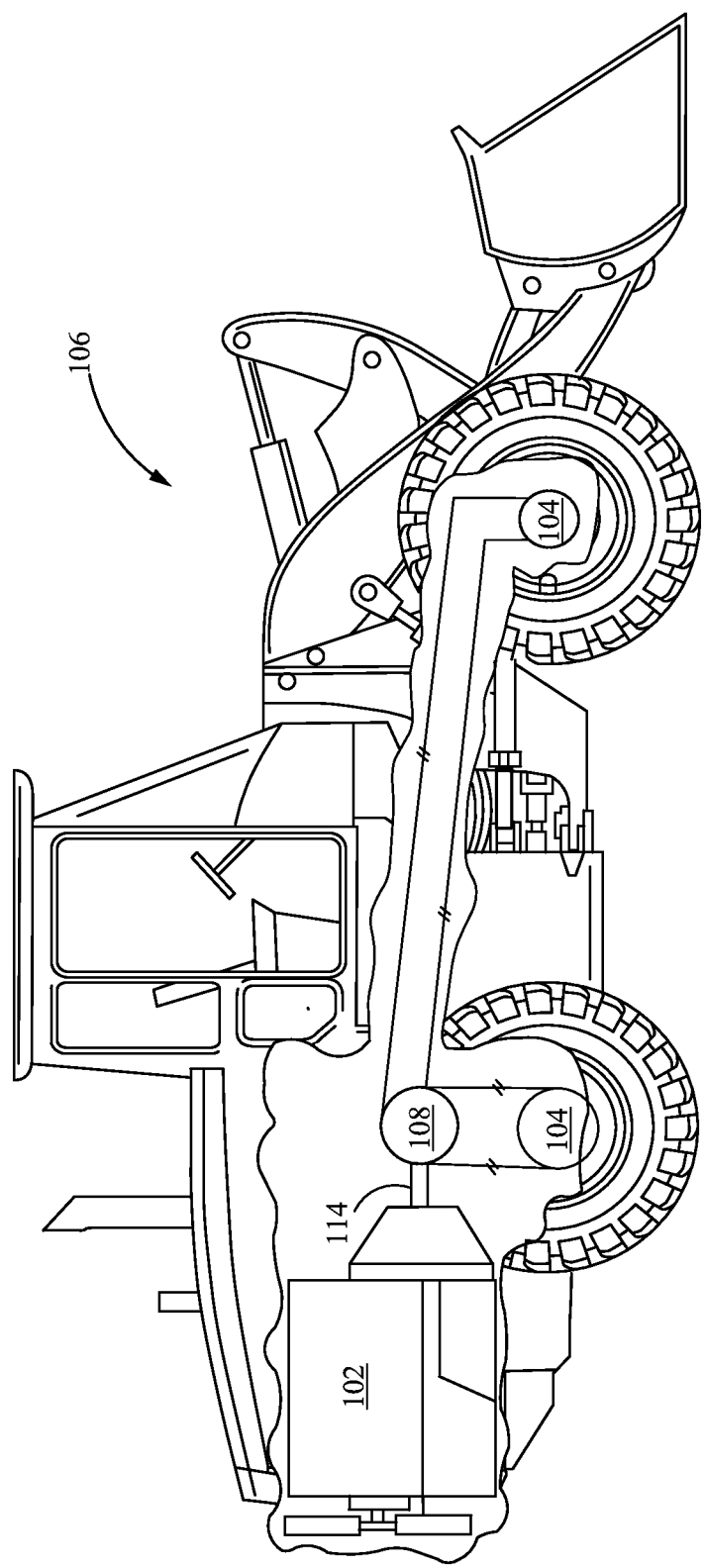
FIG. 2 is a diagrammatic view of a machine including the electric drive of FIG. 1.

Referring back to FIG. 1, with continued reference to FIG. 2, the electric drive 100 may communicate with the power source 102 through a switched reluctance (SR) machine 108, or the like. However, other types of electric machines than the SR machine 108 may be used instead. The SR machine 108 may include a rotor 110 that is rotatably disposed within a fixed stator 112. The rotor 110 of the SR machine 108 may be rigidly and rotatably coupled to an output of the power source 102 via a coupling 114, or in other embodiments, via a direct crankshaft, a gear train, a hydraulic circuit, or the like. Each phase or phase winding of the stator 112 of the SR machine 108 may be electrically coupled to a common bus 116 of the electric drive 100 via a converter circuit 118.

During a generating mode of operation, as the rotor 110 of the SR machine 108 is rotated within the stator 112 by the power source 102, electrical current may be induced within the stator 112 and supplied to the converter circuit 118. The converter circuit 118 may in turn convert the electrical signals into the appropriate direct current (DC) voltage for distribution to the load 104 and/or any other device via the common bus 116. The common bus 116 may provide terminals 120, such as positive or negative or ground lines, across which the common bus 116 may communicate a bus voltage or DC link voltage between one or more electrically parallel devices of the electric drive 100.

The load 104 may include circuitry for converting the DC voltage supplied by the converter circuit 118 into the appropriate electrical signals for operating any one or more devices associated with the electric drive 100. Additionally, during a motoring mode of operation, the SR machine 108 may be enabled to cause rotation of the rotor 110 in response to electrical signals that are provided to the stator 112 from the common bus 116.

As shown in FIG. 1, the converter circuit 118 may include a series of transistors or gated switches 122 and diodes 124 for selectively enabling one or more phase windings or phases of the SR machine 108. A three-phase SR machine 108, for example, may be driven using a converter circuit 118 with six switches 122 and six diodes 124 for selectively enabling or disabling each of the three phases of the SR machine 108. However, other configurations for the SR machine 108 are certainly possible. In addition, each of the switches 122 may further be enabled or disabled via gate signals while an external or secondary power source (not shown) may provide power across the positive and negative lines or terminals 120 of the common bus 116 to force current through the respectively enabled switches 122 and diodes 124. For example, the secondary power source may be a battery, although other suitable power supplies are certainly possible.

Still referring to FIG. 1, the electric drive 100 may also be provided with a control system 126. The control system 126 can be configured to determine a position of the rotor 110 of the SR machine 108 relative to the stator 112, and to control operation of the SR machine 108 based on the determined rotor position. The control system 126 may generally include the converter circuit 118, at least one controller 128 in communication with the gated switches 122 of the converter circuit 118, as well as a memory 130 associated with the controller 128 that is provided within and/or external to the controller 128.

More specifically, the controller 128 may be electrically coupled to the switches 122 in a manner which enables the controller 128 to selectively engage the switches 122 and source current through the different phases of the SR machine 108, as well as in a manner which enables the controller 128 to monitor electrical characteristics of the SR machine 108 and the bus or DC link voltage of the common bus 116 during operation of the SR machine 108. The memory 130 may retrievably store one or more algorithms, machine data, predefined relationships between different machine parameters, preprogrammed models, such as in the form of lookup tables and/or maps, or any other information that may be accessed by the controller 128 and relevant to the operation of the SR machine 108.

The controller 128 may be implemented using one or more of a processor, a microprocessor, a microcontroller, a digital signal processor (DSP), a field-programmable gate array (FGPA), an electronic control module (ECM), and electronic control unit (ECU), or any other suitable means for electronically controlling functionality of the control system 126. The controller 128 may be configured to operate according to predetermined algorithms or sets of instructions for operating the electric drive 100 and the SR machine 108 based on an operating mode of the SR machine 108 or other operating characteristics of the electric drive 100. Such algorithms or sets of instructions may be preprogrammed or incorporated into the memory 130 that is associated with or at least accessible to the controller 128.

INDUSTRIAL APPLICABILITY

In general, the foregoing disclosure finds utility in various applications relating to switched reluctance (SR) machines or any other suitable electric machine being employed as motors and/or generators. In particular, the disclosed systems and methods may be used to provide smoother, more effective control of SR machines and to maintain stability of SR machines in continuous conduction that are typically employed in association with the electric drives of power generation machines, industrial work vehicles, and other types of stationary or mobile machines. The present disclosure may also be implemented with other variable-speed drives commonly used in association with industrial and consumer product applications. The present disclosure may further be used with integrated starters, generators, or the like, commonly associated with automotive, aerospace, and other comparable mobile applications.

Figure 3:
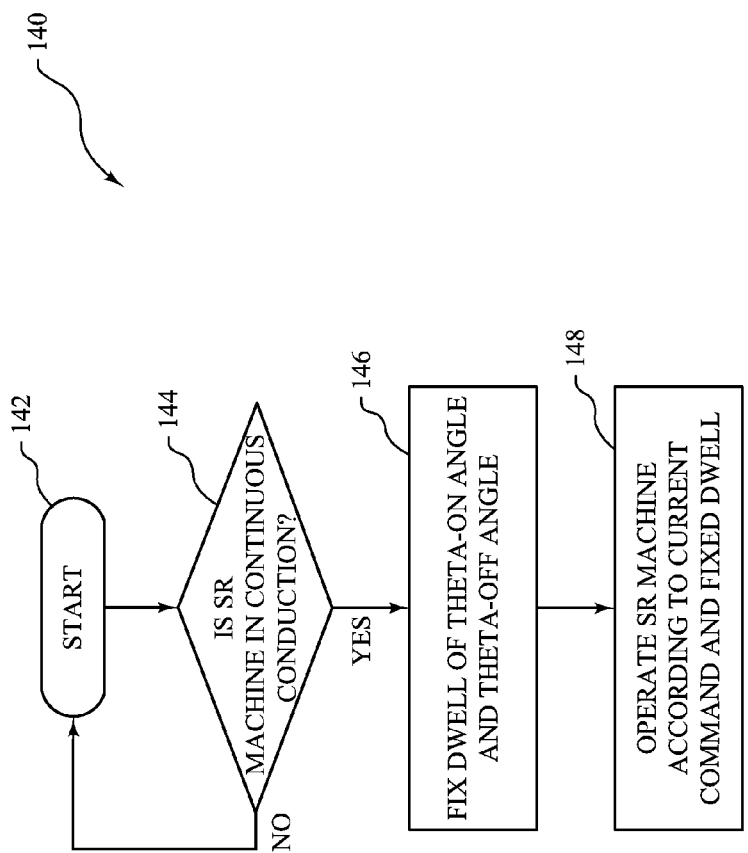
FIG. 3 is a diagrammatic view of a process for controlling the SR machine of FIG. 1.

Turning now to FIG. 3, with continued reference to FIGS. 1 and 2, an example algorithm or process 140 for controlling the SR machine 108 is provided. More specifically, the process 140 may be used to control the SR machine 108 when the SR machine 108 is in a continuous conduction mode and when the SR machine 108 is transitioning into and out of the continuous conduction mode. It is to be understood that a combined algorithm can be used for control in continuous conduction and for control outside of continuous conduction.

At block 142, the process 140 starts. At block 144, the controller 128 determines whether the SR machine 108 is in the continuous conduction mode. In order to determine whether the SR machine 108 is in the continuous conduction mode, for example, the controller 128 may first determine a torque output and a rotor speed of the SR machine 108.

The torque output and rotor speed of the SR machine 108 may be determined via encoders or sensors, such as rotor position sensors, rotor speed sensors, or the like, adapted to generate sensor signals corresponding to the rotational speed and/or position of the rotor 110 relative to the stator 112 and communicate the sensor signals to an input of the controller 128. The sensors may include a variable reluctance sensor, a capacitance sensor, a Hall-effect sensor, an anisotropic magnetoresistance sensor, or the like. The sensors may also include means for measuring any one or more of the bus voltage, the current through one or more phases of the stator 112 or the machine current, and the like. Alternatively, any one or more of the torque output, rotor speed, rotor position, bus voltage and machine current may be estimated or derived through sensorless means by the controller 128 rather than measured via encoders or sensors.

Based on the determined torque output and rotor speed, the controller 128 may determine an operating mode of the SR machine 108. For example, the controller 128 may compare the determined torque output and rotor speed to predetermined levels of torque output and rotor speed associated with the continuous conduction mode that is specific to a type of the SR machine 108. The predetermined levels of torque output and rotor speed may be stored in the memory 130 associated with the controller 128, such as, in lookup tables or maps. If each of the determined torque output and rotor speed is above the predetermined levels, then the controller 128 may determine that the SR machine 108 is in the continuous conduction mode.

If the controller 128 determines that the SR machine 108 is not in the continuous conduction mode, then the process 140 returns to start at block 142 to continue monitoring when the SR machine 108 transitions into or out of continuous conduction. If the controller 128 determines that the SR machine 108 is in the continuous conduction mode, then the process 140 proceeds to block 146. At block 146, control input parameters of the SR machine 108 may be adjusted when the SR machine 108 is in the continuous conduction mode in order to ensure stable control of the SR machine 108 when in continuous conduction and transitioning into and out of continuous conduction.

Control input parameters of the SR machine 108 may include a current command, a theta-on angle, and a theta-off angle that are sent from the controller 128 to the plurality of gates or switches 122 of the converter circuit 118. The controller 128 may be configured to control the SR machine 108 by driving the plurality of gates or switches 122 of the converter circuit 118 according to the current command, the theta-on angle, and the theta-off angle. The current command may include a current target for each phase of the SR machine 108 that corresponds to a given torque and rotor speed. The current target may correspond to an average current that a current regulator of the electric drive 100 may attempt to achieve during operation of the SR machine 108. The theta-on angle may correspond to an angle at which a voltage is applied to each phase of the SR machine 108 to turn on or open the switches 122. The theta-off angle may correspond to an angle at which a reverse voltage is applied to each phase of the SR machine 108 to turn off or close the switches 122.

At block 146, when the SR machine 108 is in the continuous conduction mode and/or transitioning into and out of continuous conduction, a dwell of the theta-on angle and the theta-off angle may be fixed. As used herein, the term "dwell" refers to an angular difference between the theta-on angle and the theta-off angle. For example, the dwell may be determined by subtracting the theta-on angle from the theta-off angle, or vice versa. The dwell of the theta-on angle and the theta-off angle may correspond to a conduction window at which the voltage is applied to each phase of the SR machine 108 and the switches 122 are open.

For instance, a fixed dwell may be greater than or equal to 180 degrees. As used herein, the term "fixed dwell" refers to an angular difference between the theta-on angle and the theta-off angle that does not change over time. For example, the fixed dwell can also be a constant dwell that does not change over a predetermined period of time. Therefore, instead of precisely manipulating the conduction window during continuous conduction, the dwell of the theta-on angle and the theta-off angle is fixed and stays constant throughout the continuous conduction mode. The dwell does not change with speed or torque once the SR machine 108 is in continuous conduction.

In an example, the fixed dwell may be equal to about 185 degrees. In another example, the fixed dwell may be equal to about 182 degrees. In yet another example, the fixed dwell may be equal to about 181 degrees. A value of the fixed dwell may be a function of the SR machine design. For instance, the SR machine design may be related to components, such as, but not limited to, a stack length or axial length of the SR machine, an outer diameter of the SR machine, and a number of stator poles and stator teeth. The value of the fixed dwell can impact whether continuous conduction is achieved, and also, at which load value continuous conduction begins. A value greater than 180 degrees may put the SR machine in continuous conduction at a higher load and speed.

Furthermore, with the fixed dwell during continuous conduction, the theta-on angle and the theta-off angle may be fixed, staying at constant values during an entire period the SR machine is in the continuous conduction mode. Alternatively, the theta-on angle and the theta-off angle may not be fixed or may be non-constant during the continuous conduction mode, as long as the dwell between the theta-on angle and the theta-off remains fixed. Therefore, the theta-on angle and the theta-off angle may change or vary during continuous conduction, but the angular difference between each stays constant.

At block 148, the controller 128 operates the electric drive 100 according to the current command and the fixed dwell of the theta-on angle and the theta-off angle. With the fixed dwell during continuous conduction of the SR machine 108, the controller 128 no longer controls a power output of the SR machine 108 by controlling a width and occurrence of the conduction window. While the dwell is fixed, the current command is not fixed. The controller 128 controls the power output of the SR machine 108 according to the current command only. Thus, the controller is configured to manage or adjust the power output of the SR machine by varying only the current command when the SR machine is in the continuous conduction mode. In so doing, power jumps of the SR machine during continuous conduction are minimized. With the fixed dwell, small changes in current result in small changes in power, and the intensity of power jumps is significantly decreased.

Figure 4:
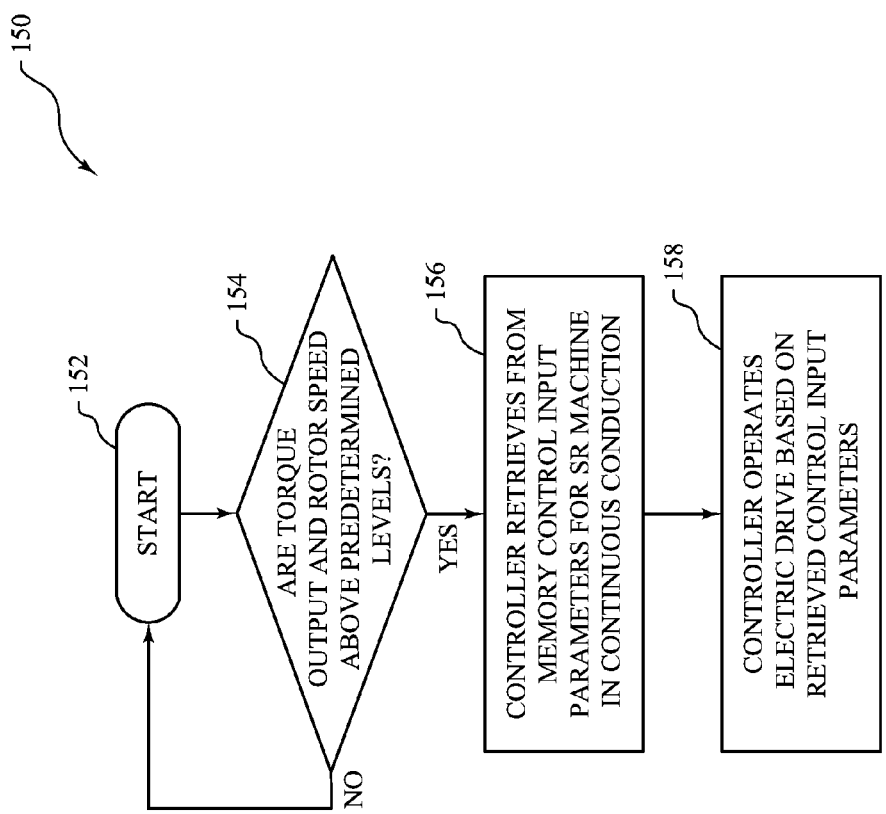
FIG. 4 is a diagrammatic view of another process for controlling the SR machine of FIG. 1.

Referring now to FIG. 4, with continued reference to FIGS. 1-3, another example algorithm or process 150 for controlling the SR machine 108 is provided. Similar to process 140 in FIG. 3, the process 150 starts at block 152 and the controller 128 determines when the SR machine 108 is in the continuous conduction mode at block 154. For example, at block 154, if each of the torque output and rotor speed is above predetermined levels, then the controller 128 may determine that the SR machine 108 is in the continuous conduction mode. When the controller 128 determines that the SR machine 108 is in continuous conduction, at block 156, the controller 128 may retrieve from memory 130 the control input parameters for the SR machine 108 for operation during the continuous conduction mode.

For example, the current command and the fixed dwell of the theta-on angle and the theta-off angle for the continuous conduction mode and/or transitions into and out of the continuous conduction mode may be provided in torque-speed lookup maps that are stored in the memory 130 associated with the controller 128. However, other configurations for providing the current command and the fixed dwell are certainly possible. The torque-speed lookup maps may be pre-programmed into memory 130 and may be directed to various modes of operation of the SR machine. The lookup maps may be optimized for different control results, including, but not limited to, maximum efficiency, minimum torque ripple, and the like. In addition, the lookup maps may contain more than one control method.

Alternatively, torque-speed lookup tables or other suitable programmable references may be used to store the current command and the fixed dwell during continuous conduction. Furthermore, when the controller 128 determines that the SR machine is in the continuous conduction mode, the controller 128 retrieves those control input parameters from the lookup maps, tables, or references stored in memory 130. At block 158, the controller 128 operates the electric drive 100 based on the retrieved control input parameters. More specifically, the controller 128 drives or controls the plurality of gated switches 122 of the converter circuit 118 according to the current command and the fixed dwell of the theta-on angle and the theta-off angle.

It is to be understood that the flowcharts in FIGS. 3 and 4 are shown and described as an example only to assist in disclosing certain features and that more or fewer steps than shown, in a same or different order, may be included in the method corresponding to the various features described above without departing from the scope of the present disclosure.

By applying the fixed dwell of the theta-on/off angles to the gates of the converter circuit when the SR machine is in continuous conduction, the controller of the disclosed electric drive and method manages the SR machine power output by varying only the current command. In so doing, the disclosed electric drive and method significantly reduce sudden power jumps, such as, during continuous conduction, during transition from part load to continuous conduction, and during transitions into and out of continuous conduction. As a result, steady operation and stable control of the SR machine during continuous conduction is achieved. It is to be understood that although the fixed dwell is disclosed herein as applied to the continuous conduction mode, the fixed dwell may also be applied to other operating modes of the SR machine without departing from the scope of the disclosure.

While the foregoing detailed description has been given and provided with respect to certain specific embodiments, it is to be understood that the scope of the disclosure should not be limited to such embodiments, but that the same are provided simply for enablement and best mode purposes. The breadth and spirit of the present disclosure is broader than the embodiments specifically disclosed and encompassed within the claims appended hereto. Moreover, while some features are described in conjunction with certain specific embodiments, these features are not limited to use with only the embodiment with which they are described, but instead may be used together with or separate from, other features disclosed in conjunction with alternate embodiments.

What is claimed is:

1. A control system for a switched reluctance (SR) machine having a rotor and a stator, the control system comprising:
    a converter circuit operatively coupled to the stator and including a plurality of gates in selective communication with each phase of the stator; and
    a controller in communication with each of the stator and the converter circuit, the controller configured to command a fixed dwell of a theta-on angle and a theta-off angle to the plurality of gates when the SR machine is in a continuous conduction mode, wherein the theta-on angle and the theta-off angle may vary during the continuous conduction mode but an angular difference between each stays constant.

2. The control system of claim 1, wherein the controller is configured to control a power output of the SR machine in the continuous conduction mode according to a current command to the plurality of gates.

3. The control system of claim 2, wherein the current command is not fixed when the SR machine is in the continuous conduction mode.

4. The control system of claim 1, wherein the theta-on angle and the theta-off angle are fixed when the SR machine is in the continuous conduction mode.

5. The control system of claim 1, wherein the theta-on angle and the theta-off angle are non-constant when the SR machine is in the continuous conduction mode.

6. The control system of claim 1, wherein the controller is configured to determine when the SR machine is in a continuous conduction mode.

7. The control system of claim 6, wherein the controller is configured to determine the continuous conduction mode of the SR machine based on a torque output and a rotor speed of the SR machine.

8. The control system of claim 1, wherein the fixed dwell is greater than 180 degrees.

9. The control system of claim 8, wherein the fixed dwell is about 185 degrees.

10. An electric drive, comprising:
- a switched reluctance (SR) machine having a stator and a rotor rotatably disposed relative to the stator;
- a converter circuit operatively coupled to the stator and including a plurality of gates in selective communication with each phase of the stator; and
- a controller in communication with each of the stator and the converter circuit, the controller configured to control the plurality of gates during a continuous conduction mode according to a current command and a constant dwell of a theta-on angle and a theta-off angle, wherein the theta-on angle and the theta-off angle may vary during the continuous conduction mode but an angular difference between each stays constant.

11. The electric drive of claim 10, wherein the controller is configured to manage a power output of the SR machine during the continuous conduction mode by varying only the current command to the plurality of gates.

12. The electric drive of claim 10, wherein the current command and the constant dwell of the theta-on angle and the theta-off angle during the continuous conduction mode are provided in torque-speed lookup maps stored in a memory associated with the controller.

13. The electric drive of claim 10, wherein the theta-on angle and the theta-off angle are constant during the continuous conduction mode.

14. The electric drive of claim 10, wherein the theta-on angle and the theta-off angle are non-constant during the continuous conduction mode.

15. A method of controlling a switched reluctance (SR) machine having a rotor, a stator, a converter circuit operatively coupled to the stator and including a plurality of gates in selective communication with each phase of the stator, and a controller in communication with each of the stator and the converter circuit, the method comprising:
- the controller determining a continuous conduction mode of the SR machine; and
- when the SR machine is in the continuous conduction mode, the controller driving the plurality of gates of the converter circuit according to a current command and a fixed dwell of a theta-on angle and a theta-off angle, wherein the theta-on angle and the theta-off angle may vary during the continuous conduction mode but an angular difference between each stays constant.

16. The method of claim 15, further comprising the controller adjusting a power output of the SR machine by varying only the current command when the SR machine is in the continuous conduction mode.

17. The method of claim 16, further comprising providing the current command and the fixed dwell of the theta-on angle and the theta-off angle in torque-speed lookup maps stored in a memory associated with the controller.

18. The method of claim 16, further comprising the controller determining a rotor speed and a torque output of the SR machine.

19. The method of claim 18, further comprising the controller determining the continuous conduction mode of the SR machine based on the determined rotor speed and torque output of the SR machine.

20. The method of claim 16, further comprising the controller maintaining stability of the SR machine when transitioning into and out of the continuous conduction mode by driving the plurality of gates according to the fixed dwell of the theta-on angle and the theta-off angle.

\* \* \* \* \*